Patented Dec. 16, 1930

1,785,701

UNITED STATES PATENT OFFICE

IZADOR J. NOVAK, OF BRIDGEPORT, CONNECTICUT, ASSIGNOR, BY MESNE ASSIGNMENTS, TO RAYBESTOS-MANHATTAN, INC., A CORPORATION OF NEW JERSEY

FRICTION ELEMENT AND PROCESS OF MAKING THE SAME

No Drawing. Application filed June 20, 1928. Serial No. 287,046.

The present improvements relate more particularly to the production of brake linings of the hard formed segmental type wherein the binder comprises rubber or other suitable binder in minor proportion to asbestos fibre.

It is well known in the art of making brake lining of the hard segmental type, wherein rubber or other suitable binder is used in minor proportion relative to the asbestos, to make up a mixture of rubber, asbestos and solvent for the rubber, and to dry out the solvent and sheet the asbestos and rubber on a pair of horizontal rolls having even surface speed, one roll being heated and the other being cooled, whereby a sheet is formed on the heated roll as the solvent dries out of the compound, and pressure is applied through the cold roll to densify the sheet. After the sheet is formed to the desired thickness, which, it may be added, is rarely above $\frac{1}{16}$ of an inch, the rolls are stopped, and the sheet is stripped from the hot roll.

Because of the fact that it is difficult to build up thicknesses substantially greater than $\frac{1}{16}$ of an inch on rolls of this type, in making greater thicknesses such as those used in brake lining, which range commonly between $\frac{5}{32}$ and $\frac{1}{4}$ of an inch, it has been necessary in the past to secure these thicknesses by laminating two or more sheets from the sheeting machine above described by means of rubber cement, or other cements. A type of segmental brake lining now on the market comprises laminated sheet packing wherein sufficient sulphur is used with the rubber to produce hard rubber, and where the laminated sheet packing is cut into strips of the desired developed length and width and is cured hard by heat while held to a curvature.

Another type comprises sheet packing wound on a mandrel with fine brass wires and cementing material between the convolutions, the whole thereafter being cured hard while held under pressure. After cure, the segments are cut from the cylinder thus produced. It will be appreciated by those skilled in the art, that because of the laminated structure necessarily inherent in brake linings made from these sheets, there is always the danger of delamination under the severe abuse encountered in use. Also, the cost of production necessarily includes the cost of making sheet packing, which latter cost is high because of the fact that during one cycle, only a thin sheet may be produced. Furthermore, such rolls for making sheet packings are necessarily large in size, and must be held to accurate dimensions, which means high cost of installation and upkeep. Rolls 10 to 15 feet long and 3 to 5 feet in diameter are considered modern practice in producing sheet packing. Again, in order to make sheets of fair thicknesses on a sheet packing roll, that is, between $\frac{1}{32}$ and $\frac{1}{16}$ of an inch, a fairly long fibre asbestos is essential and such grades run from $150.00 to $300.00 per ton at the present time. By the method to be hereinafter described, short fibres ranging in cost from approximately $30.00 to $80.00 per ton are advantageously used, and long fibres are entirely unnecessary. Also, expensive, sheet packing rolls are dispensed with entirely, and comparatively inexpensive equipment substituted. The development of the present invention contemplates the production of a single ply unitary structure of unwoven asbestos with a binder comprising rubber or other suitable material whereby any desired thickness may be produced, and short fibre asbestos is used to advantage. Tapes made according to the present invention are admirably suitable for the production of hard formed unwoven brake lining segments.

Among the advantages therefore, of the present invention as compared with processes now in use for making this type of brake lining, is that the final product is a single ply unitary structure having no laminations or plies, which of course, eliminates danger of delamination. Another advantage is the speed of production due to the speed with which an extruding machine can be operated as compared with present methods of manufacture. This of course, is of importance from the standpoint of economy in labor cost per unit manufactured, in addition to decreasing all of the costs entered into in manufacturing. Another incidental advantage resides in the use of an extruding machine costing comparatively little initially and to maintain and operate, as compared with a set of sheeting rolls which have a high initial cost and expensive maintenance cost and require skilled labor for operation. The use of an extruding machine also results in the advantage of not having an expensive machine idle when it is necessary to shut down for any reason. This will be obvious from the fact that a battery of extruding machines can be purchased and operated for the relative cost of one set of sheeting rolls.

Another advantage is the flexibility of the asbestos fibre quality, there being a minimum fibre length as stated above which can be sheeted on sheet packing rolls, but there being no minimum to the fibre length which can be extruded from an extruding machine. In addition, the use of the present process eliminates or substantially decreases the necessity for using rubber cement for plying, which is an expensive item in conventional processes of manufacture.

Other objects and advantages will be more apparent from the following description.

On one mode of carrying out this invention, compound of approximately the following composition is prepared by mixing in a Werner-Pfleiderer dough mixer:

|  | Parts |
|---|---|
| Smoked sheet | 14.0 |
| Litharge | 4.5 |
| Sulfur | 9.0 |
| Carbon black | 3.0 |
| Short asbestos fibre grade XX | 60.0 |
| Benzol | 126.0 |

It will be noted that I preferably use a low proportion of solvent for a reason which will be explained later. The above mixing necessarily further loosens up the asbestos fibres and distributes the fibres and other ingredients throughout the mass of the compound. The plastic mass resulting from the above mixing is fed into the hopper of a standard extruding or tubing machine such as is used in making rubber tubing, insulated wire, automobile treads, etc., which is provided with an orifice at the head so designed as to give the desired cross-section, preferably a tape of about the width of the finished brake lining and a thickness of extruded tape which contains the necessary amount of solid material desired for the finished density. As the asbestos fibres obviously run in all directions throughout the mass of the material when extruded, they run in all directions throughout the mass of the tape. This is particularly advantageous because it makes a strong product, after the subsequent compression and hardening, i. e., stronger and less likely to separate into laminations than would be the case if the tape were built up in laminations or all the fibres ran parallel to the length of the tape. Also the sides of the die orifice smooth and surface-trowel as it were, the surface of the tape. It will be seen that I am extruding a composition which contains considerable solvent. On drying out this solvent, the residual solids are left in a porous but uniformly bound condition without breaks or laminations, and must later be compressed to give sufficient density. It is, therefore, necessary to allow for the pore space occupied by the solvent in designing the orifice of the tubing machine. With the above compound for a finished thickness of approximately .180", it is necessary to make a wet tape of approximately .343".

On leaving the head of the tubing machine, the extruded tape may be taken up on a moving belt and carried through a heated drying chamber to remove the solvent, which, of course, may be recovered, if desired. At the end of the drying chamber, the partially or completely dried tape is fed into a take-up device which winds it into rolls of suitable diameter for easy handling. This step of winding the porous ribbon on a reel is of course, for convenience, and is not a necessary or essential step of the process.

If the drying is not complete at this point, the rolls should be placed in a drying oven and the stock dried until the solvent is completely removed. This when a volatile solvent is used is necessary to prevent blistering in later curing operation.

At this point, the product is a flexible spongy tape with the fibres in the interior running in all directions which must be further compressed to the required density for brake lining. This is accomplished by passing the tape through pressure rolls so gauged as to give the desired compression though of course other means of compressing the tape may be employed. For instance, in the above stated example, it is approximately .343" thick and is compressed in these rolls to approximately .180", the density being approximately one oz. per cu. in. Because of the nature of this composition, such compression takes place quite easily without substantial stretching or distortion of the tape. Any such deformation strains in any direction are of course resisted by the fibres which run in all directions.

After the tape has been compressed to size, which may be as above described or in a hydraulic press, it is cut into pieces of the desired developed length of the segment to be made. These pieces have now the exact width, length and thickness of the finished segment. They are now placed in curved forms of the desired curvature and while so held, are subjected to heat sufficient to vulcanize the rubber or harden the other binder contained therein, which may be 275–325° F. more or less, for 1 to 4 hours, more or less, depending on the thickness of the finished segment, the temperature and the types of binder and accelerator used.

In the above composition, the cure is approximately 3 hours at about 325° F. This may be materially shortened by the use of rapid rubber accelerators. The curing is accomplished ordinarily by placing the forms in heated ovens but it may also be advisable in some cases to conduct the cure in the ordinary type of heated mold under hydraulic pressure. The finished segment is now ready for application to brake shoes. It may or may not be machined on the surface, according to the accuracy desired. As a matter of fact, the above described process produces a segment which is smooth and well within the limits necessary for segmental brake linings of this type.

Because of the fact that it is a unitary mass of fibres, uniformly distributed throughout the mass and running in all directions therein, densely compacted and having no laminations, it gives very satisfactory results in service and shows no tendency to break down and disintegrate. Its tensile strength is of the order of 5000–6000 lbs. per square inch and its hardness 21–25 Brinell, using a 500 kg. load on a 1 mm. ball. If the amount of solvent used is too great, two things will occur on attempting to extrude the composition: (1) The composition will not feed through the worm because of its slipperiness, and (2) what material passes through the worm and through the head will show the effect of individual lumps of compound and there will be breaks and separated portions of extruded stock from which no satisfactory tape can be made. In order to avoid this, it is necessary to limit the amount of solvent to such a quantity as will produce a solid extruded tape without breaks. It may also be desirable to introduce certain resinous materials such as oil-soluble phenol resin which will increase the adhesion of the stock to the worm of the extruding machine. As an example of the latter, I have used the following composition with excellent results:

|  | Parts |
|---|---|
| Oil soluble phenol resin | 5 |
| Rubber | 10 |
| Litharge | 4.5 |
| Sulfur | 9 |
| Carbon black | 3 |
| XX asbestos fibre | 60 |
| Benzol | 126 |

By the method above described, it will be noted that the production of the sheet material is entirely unnecessary in the process as is also lamination. The present process as carried out in the above-described illustrative example thus comprises essentially the formation of binder, asbestos, and solvent into tape having a desired cross-section, removal of the solvent, and the processing of the dried tape into condensed strips suitable for cure in forms to a required curvature. The economy of this method over the lamination of thin sheets prepared on costly machinery is obvious.

It may be found desirable to omit the last step in this process, that of curing in forms, and to substitute a partial cure to produce a flexible unwoven tape which may be marketed in rolls, as in the present flexible woven brake lining. This of course, would be included within the scope of the present invention.

It may also be advisable to introduce, either in conjunction with rubber or as binders in their own right, other materials such as phenol resins, stearin pitch, casein, celluloseacetate, viscose, drying oils and the like. Any of these changes would, of course, modify the handling of the extruded tape, but would not affect the intent of this invention, which is to provide an economical method of producing any desired thickness of asbestos, binder, and solvent by extrusion through a predetermined orifice, where the nature of the compound is such that such extrusion could not take place except by the use of an extending solvent in considerable proportion. It is obvious to those skilled in the art that a mixture such as above designated without the use of a solvent would not be extruded because of the relatively small volume of rubber or other binder and asbestos, and because of the fact that asbestos, because of its fibrous nature, is very difficult to extrude without some means of extending it and preventing it from packing in the head of an extruding machine.

In the two illustrations given in the foregoing specification, I have cited the use of benzol as a solvent. It is to be understood of course, that any other type of solvent suitable for the purpose may be employed. I do not wish to be limited to benzol. It is also to be understood that the relative proportions of constituents as well as the cited lengths, widths and thicknesses of the intermediate and final products set out in the specification are merely illustrative, and may be varied widely within the scope of the invention. The subject matter of the present claims is also disclosed in a pending application by Abert and Whitelaw No. 376,639, filed July 8, 1929, assigned to the assignee of this application, Raybestos-Manhattan, Inc.

I have described in the above specification, the use of a standard tubing machine in which the force necessary for extrusion is developed by the action of a revolving worm on a plastic composition, but it is obvious that this force may also be developed in other mechanical devices, such as for example, a ram and cylinder, and it is to be understood that no limitation as to the type of extrusion apparatus is intended.

I claim as my invention:

1. The process of producing a friction material for a friction element suitable for automobile brakes, clutches and the like which comprises mixing together fibrous asbestos and a hardenable binder into a readily-malleable mass with the fibres distributed through the same, extruding the mass through a suitable die thereby producing a continuous unlaminated strip of the cross-section desired surface-troweled on all sides by the action of the die and with the fibres in the interior thereof running in substantially all directions, drying the product thereby producing a flexible porous mass of somewhat greater thickness than that of the completed article and compressing and hardening the same into a hard dense article of the desired shape.

2. The process of producing a friction material for a friction element suitable for automobile brakes, clutches and the like which comprises mixing together fibrous asbestos and vulcanizable rubber with a volatile solvent into a readily-malleable mass with the fibres and solvent distributed throughout the same, extruding the mass through a suitable die thereby producing a continuous unlaminated strip of the cross-section desired surface-troweled on all sides by the action of the die and with the fibres in the interior thereof running in substantially all directions, drying the product and driving off the solvent thereby producing a flexible porous mass of somewhat greater thickness than that of the completed article and dividing the strip into sections and compressing and vulcanizing the same into a hard and dense article of the desired shape.

In testimony whereof I affix my signature.

IZADOR J. NOVAK.